A. M. THOMPSON.
MOLDING DEVICE.
APPLICATION FILED MAR. 23, 1908.

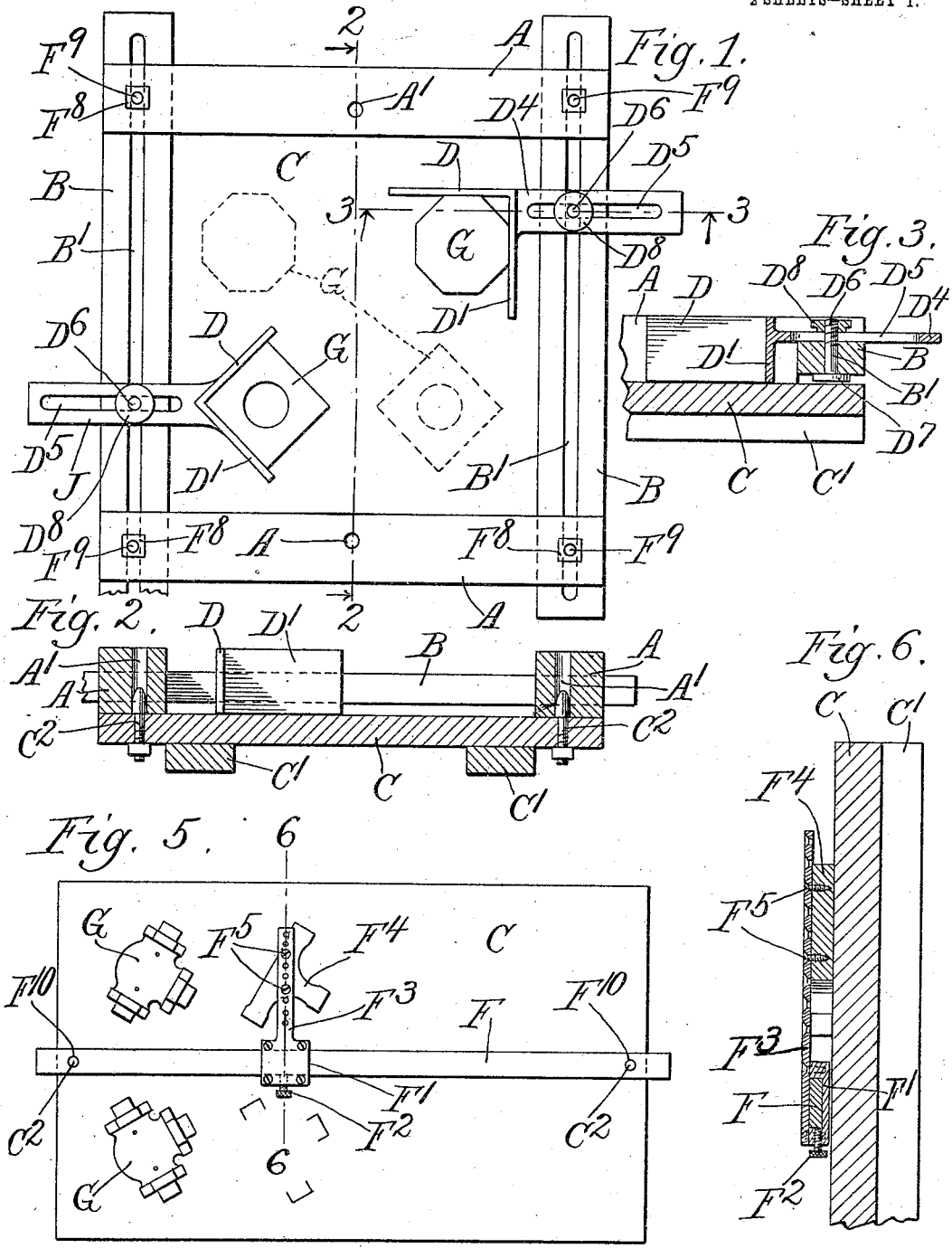

928,714.

Patented July 20, 1909.

2 SHEETS—SHEET 2.

Fig. 4.

Witnesses,
Edward T. Wray.
Sophie B. Werder.

Inventor.
Alexander M. Thompson,
by Parker & Carter
Attorneys.

UNITED STATES PATENT OFFICE.

ALEXANDER M. THOMPSON, OF CHICAGO, ILLINOIS.

MOLDING DEVICE.

No. 928,714.   Specification of Letters Patent.   Patented July 20, 1909.

Application filed March 23, 1908.   Serial No. 422,678.

*To all whom it may concern:*

Be it known that I, ALEXANDER M. THOMPSON, a citizen of the United States, residing at Chicago, in the county of Cook and State of Illinois, have invented a certain new and useful Improvement in Molding Devices, of which the following is a specification.

My invention relates to molding devices to provide convenient means whereby patterns may be applied to a mold board rapidly and accurately.

My invention is illustrated in the accompanying drawings, wherein—

Figure 1 is a plan view; Fig. 2, a section on line 2—2 of Fig. 1; Fig. 3, a section on the line 3—3 of Fig. 1; Fig. 4, a plan view of a modified form of the device; Fig. 5, a similar plan view of a further modification; Fig. 6, a cross section on the line 6—6 of Fig. 5.

Like parts are indicated by the same letter in all the figures.

A A are end bars of a frame, B B the side bars. The side bars have holes $A^1$ $A^1$ and the end bars slots $B^1$ $B^1$.

C is the mold board mounted on transverse bars $C^1$ $C^1$ and having the pins $C^2$ $C^2$ which project beyond its face and are adapted to be received into the holes $A^1$. The frame serves as a support for the guide which consists of the two plates D $D^1$ rigidly secured together to form a square or which may be one or both of them pivotally mounted at their engaging edges $D^2$, in that case being held in any position by the vertical set screw $D^3$, as indicated in Fig. 4. These plates are mounted each on an arm $D^4$, which projects over the frame and is slotted at $D^5$ and adjustably secured in position by the bolt $D^6$, whose head $D^7$ lies under the side bar of the frame and whose shank passes through the slot $B^1$ and which is provided with a nut $D^8$ whereby the parts may be securely fixed in position.

J is a modification shown in Fig. 1; plates D and $D^1$ are set at an angle to the axis of the arm and are rigid in position. In Fig. 4, the arm $D^4$ is secured by the set screws E E which pass through the slot $D^5$ in the arm and through a slide $E^1$ adjustably secured on the side bar B by the thumb screw $E^2$.

F is a rod or bar used as a substitute for the frame and serving also to support the guides. It is perforated at its end at $F^{10}$ to receive the pins $C^2$ on the mold board. Mounted on this bar so as to slide therealong, is a slide $F^1$ provided with a thumb nut $F^2$ whereby it can be locked in any position. Projecting from it is a perforated short bar $F^3$ to which can be secured the guide $F^4$ in any desired position by thumb screws $F^5$. This guide is a thin plate marked and cut of a predetermined size to locate the position of a predetermined pattern.

G G are patterns of various kinds and H H the gates which connect them together in groups.

In Fig. 1 the bars of the frame are shown as adjustably united at the corners by means of set screws $F^9$ and nuts $F^8$ associated with the slot $B^1$.

My apparatus as shown, embraces substantially the following: a mold board, a frame or bar thereon adapted to serve as a jig or support and guides to locate the several patterns mounted on the jig or supports. These guides are of various types or patterns and they may be mounted either on the frame or bar and so as to be adjustable therealong or with reference thereto and so as to be swung with the bar or frame from one side of the board to the other.

It is to be understood that my drawings are to be taken as diagrammatic and considerable alterations can be made without departing from the spirit of my invention. What I have illustrated, sufficiently shows a working device or apparatus, but in its commercial form it might assume a very different character. I have shown modifications, thus indicating equivalent parts which may be substituted one for another under certain conditions.

The use and operation of my invention are as follows: A mold board of the proper size and shape and provided with means whereby the support or jig may be applied to it is placed in position. The means referred to preferably consist of pegs or pins projecting from the face of the board and on its axial line. The frame is now applied to the board, its two holes engaging the two pins. The half of a given pattern will now be placed approximately in the position it ought to have, and a guide will be adjusted so that it comes into proper guiding or spacing relation to such pattern. The guide is then securely fixed in position by the thumb screw. The pattern portion is now placed in position in contact with the guide and is then spiked to the board. There may be any number of such adjustments and placings of pattern portions along either side of the board, or if there be but one type of pattern, then when the one has been placed in position, the frame is picked up and turned over so that the guide comes on the other side of the axial line of the board. Here the process is repeated, though of course, the position and adjustment of the guide will not be changed. The frame can be turned over in both directions so that with one guide four pattern portions may be set. Thus the board will have its face covered with the pattern sections. These patterns can now be impressed in the usual manner in the flask portions and it is obvious that when the parts are brought together the complete flask will contain perfect molds.

The advantage of this apparatus is that the mold boards can be reused any number of times and the patterns can be placed upon them in the easiest, quickest and most accurate manner. Skilled labor is no longer necessary.

It is obvious that the form of the guide and of the pattern is of no importance. In Fig. 4, I have shown a modified form of attachment of the guide to the side bar of the frame and a pivotal arrangement of the portions of the guide. This is to adapt it for more easy application to various forms of patterns. In Fig. 5, a further modification is shown, but the action is much the same. Here the bar is raised after its pattern position is marked, and the pattern then placed in position and spiked down. The bar is then turned over and the oppositely positioned pattern piece is spiked to the board.

I claim:

1. A molding device comprising a base to receive the pattern sections, a support adaptably fitted thereon and guides on the support adapted to make loose contact with the pattern section.

2. A molding device comprising a base to receive the pattern sections, a support adaptably fitted thereon, in two or more related positions, and guides on the support adapted to make loose contact with the pattern sections.

3. A molding device comprising a base to receive the pattern sections, a support adaptably fitted thereon and guides on the support, said guides adjustable on the support adapted to make loose contact with the pattern sections.

4. A molding device comprising a base to receive the pattern sections, a support adaptably fitted thereon in two or more related positions, and guides on the support, said guides adjustable on the support adapted to make loose contact with the pattern sections.

5. A molding device comprising a base to receive the pattern sections, a support consisting of a frame removably mounted on the board, and guides mounted on the frame adapted to make loose contact with the pattern sections.

6. A molding device comprising a base to receive the pattern sections, a support consisting of a frame removably mounted on the board, and guides adjustably mounted on the frame adapted to make loose contact with the pattern sections.

7. A molding device for patterns comprising a base upon which the patterns are to be secured, a reversible frame adapted to be fitted upon the base in various positions, and guides secured to the frame and adapted to mark the positions of the patterns on the base.

8. A molding device for patterns comprising a base upon which the patterns are to be secured, a reversible frame adapted to be fitted upon the base in various positions, and guides secured to the frame and adapted to mark the positions of the patterns on the base, said guides adjustable along the frame.

9. A molding device for split patterns, comprising a base upon which the pattern sections are to be secured, a reversible frame adapted to be fitted upon the base in various positions, and guides secured to the frame and adapted to mark the positions of the pattern sections on the base.

10. A molding device for split patterns, comprising a base upon which the pattern sections are to be secured, a reversible frame adapted to be fitted upon the base in various positions, and guides secured to the frame and adapted to mark the positions of the pattern sections on the base, said guides adjustable along the frame.

11. A molding device for patterns comprising a base upon which the patterns are to be secured, a reversible frame adapted to be fitted upon and secured to the base in various positions, guides adjustably secured to the frame, and projecting therefrom in substantial parallelism with the surface of the base, and shaped so as to engage the pattern at two or more points, and thus mark its positions on the base.

ALEXANDER M. THOMPSON.

Witnesses:
EDNA K. REYNOLDS,
SOPHIE B. WERNER.